US009325892B2

(12) United States Patent
Bolton et al.

(10) Patent No.: US 9,325,892 B2
(45) Date of Patent: *Apr. 26, 2016

(54) SYSTEMS AND METHODS FOR REMOTE CAMERA CONTROL (71) Applicant: Apple Inc., Cupertino, CA (US)

(72) Inventors: Lawrence G. Bolton, Mahomet, IL (US); Sylvain R. Y. Louboutin, Sunnyvale, CA (US); Shailesh Rathi, San Jose, CA (US); David J. Rempel, San Jose, CA (US); Peter T. Langenfeld, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,119

(22) Filed: Jan. 24, 2014

(65) Prior Publication Data

US 2014/0354838 A1 Dec. 4, 2014

Related U.S. Application Data (63) Continuation of application No. 12/554,228, filed on Sep. 4, 2009, now Pat. No. 8,675,084.

(51) Int. Cl.
*H04N 5/232* (2006.01)
*H04M 1/725* (2006.01)
*H04N 1/00* (2006.01)
*H04N 101/00* (2006.01)

(52) U.S. Cl.
CPC ......... *H04N 5/23203* (2013.01); *H04M 1/7253* (2013.01); *H04N 1/00347* (2013.01); *H04N 5/23216* (2013.01); *H04N 5/23245* (2013.01); *H04M 2250/52* (2013.01); *H04N 2101/00* (2013.01); *H04N 2201/0013* (2013.01); *H04N 2201/0055* (2013.01); *H04N 2201/0074* (2013.01); *H04N 2201/0084* (2013.01); *H04N 2201/0087* (2013.01); *H04N 2201/0089* (2013.01)

(58) Field of Classification Search
CPC ............ H04N 5/232–5/23206; H04N 5/23245
USPC ............................... 348/211.99–211.4, 211.6
See application file for complete search history.

(56) References Cited

U.S. PATENT DOCUMENTS

| 7,305,506 | B1 | 12/2007 | Lydon et al. |
| 7,441,062 | B2 | 10/2008 | Novotney et al. |
| 7,526,588 | B1 | 4/2009 | Schubert et al. |
| 7,529,870 | B1 | 5/2009 | Schubert et al. |
| 7,529,871 | B1 | 5/2009 | Schubert et al. |

(Continued)

*Primary Examiner* — Timothy J Henn
(74) *Attorney, Agent, or Firm* — Kilpatrick Townsend & Stockton, LLP (57) ABSTRACT A camera capable of capturing still images and video and included in a portable media device can be controlled remotely using an accessory. The accessory can register with the PMD to automatically receive notifications whenever there is a change in the camera state. The camera states can include mode, operation status, and configuration settings. The accessory can send instructions to a camera application that interfaces with the camera to control the camera. The accessory can remotely activate the camera, change camera mode, and send instructions to operate the camera. The accessory and the PMD can concurrently control the camera. The PMD can send the captured still images and recorded video to the accessory for preview and receive instructions from the accessory on disposition of the still images and the video.

23 Claims, 7 Drawing Sheets (56) References Cited

U.S. PATENT DOCUMENTS

| | | |
|---|---|---|
| 7,529,872 B1 | 5/2009 | Schubert et al. |
| 8,675,084 B2 * | 3/2014 | Bolton et al. ............... 348/211.4 |
| 2005/0007457 A1 * | 1/2005 | Karlock .................... 348/211.4 |
| 2006/0055790 A1 | 3/2006 | Chen |
| 2006/0061663 A1 | 3/2006 | Park |
| 2007/0081807 A1 | 4/2007 | Lai |
| 2007/0109417 A1 | 5/2007 | Hyttfors et al. |
| 2007/0223901 A1 | 9/2007 | Fujimoto |
| 2007/0254640 A1 | 11/2007 | Bliss |
| 2007/0286587 A1 | 12/2007 | Hwang |
| 2008/0278580 A1 | 11/2008 | Bentkovski |
| 2010/0289910 A1 | 11/2010 | Kamshilin |

* cited by examiner

| Command | Direction | Payload |
|---|---|---|
| SetEventNotification | A → P | Event Classes |
| GetEventNotification | A → P | None |
| RetEventNotification | P → A | Camera State |
| GetSupportedNotification | A → P | None |
| RetSupportedNotification | P → A | Event Classes |
| PMDNotification | P → A | Camera state |
| CameraButtonStatus | A → P | Camera Action / Mode Change |

SYSTEMS AND METHODS FOR REMOTE CAMERA CONTROL

CROSS-REFERENCES TO RELATED APPLICATIONS

This application is a continuation of U.S. patent application Ser. No. 12/554,228 filed Sep. 4, 2009, the disclosure of which is incorporated herein by reference in its entirety.

BACKGROUND

The present disclosure relates generally to media players and in particular to controlling a camera in a portable media device.

A portable media device can store a variety of digital information such as audio tracks, video tracks, photos, and other information. Examples of portable media devices are the iPod® and the iPhone™ portable media devices, which are available from Apple Inc. of Cupertino, Calif.

A portable media device can include one or more connectors or ports that can be used to interface with other devices. For example, the connector or port can enable the portable media device to couple to a host computer, be inserted into a docking system, or receive an accessory device. In the case of the iPod®, e.g., a vast array of accessory devices have been developed that can interconnect to the portable media device.

In some instances, a portable media device can have the capability of taking still photos and recording video. For example, a portable media device may include a camera and an associated camera application to control the camera. The camera application can be used to control various aspects of the camera including taking still photographs and recording video.

In addition to taking pictures and recording video with the camera, an accessory can be used to communicate with the portable media device to control the camera remotely to take pictures and record video.

SUMMARY

Certain embodiments of the present invention relate to remotely controlling a camera included in a portable media device. A portable media device can have ability to take still photos or record video. In some embodiments, an accessory can control the camera by communicating with the portable media device using a plurality of commands. In an embodiment, the portable media device can have a camera application program resident on the portable media device that can communicate with the camera in order to operate the camera.

In some embodiments, the accessory can register with the portable media device to receive notifications regarding camera state changes. The camera state change notifications can be automatically sent to the accessory upon registration. In an embodiment, the camera state change notifications can be sent asynchronously to the accessory whenever there is a change in the camera state. In some embodiments, the accessory can remotely change the camera mode and remotely operate the camera including activating the camera application. In some embodiments, the camera can be concurrently controlled from the accessory and from the portable media device.

In some embodiments, the portable media device can send the captured still image or the recorded video to the accessory for preview. In some embodiments, the accessory can send instructions to the portable media device about the disposition of the still image or the video. In other embodiments, the accessory can access the still images and videos stored in the portable media device remotely and send instructions to the portable media device for playback of the still images, e.g., slide show, and videos.

The following detailed description, together with the accompanying drawings will provide a better understanding of the nature and advantages of the present invention.

DETAILED DESCRIPTION

Certain embodiments of the present invention relate to controlling a camera included in a portable media device. A portable media device can have a camera that is capable of capturing still photos and recording video. In an embodiment, the portable media device can have a camera application program resident on the portable media device that can communicate with the camera in order to operate the camera. In some embodiments, an accessory can control the camera using a set of commands exchanged between the portable media device and the accessory. In some embodiments, the accessory can register with the portable media device to receive notifications regarding camera state. Once registered, the accessory can receive notification regarding changes in camera state from the portable media device without having to request an update.

In some embodiments, the accessory can remotely start the camera application if the accessory receives a notification that the camera is inactive. In some embodiments, the accessory can change the camera mode (e.g., between still photo and video modes), instruct the camera to capture a still image, instruct the camera to start video recording, or instruct the camera to stop video recording. An image as described herein can be a still image, e.g., still photo, or a moving image, e.g., a video; hence, "capturing an image" can encompass both still images and video recordings. In some embodiments, the accessory can receive the image captured by the camera for preview and can instruct the portable media device about the disposition of the image, e.g., save or delete. In some embodiments, the accessory can periodically send an image capture command to the portable media device to enable the camera to take a series of still images during a predetermined time. In some embodiments, the accessory can instruct the portable media device to take a series of images over a given time period.

Figure 1A:
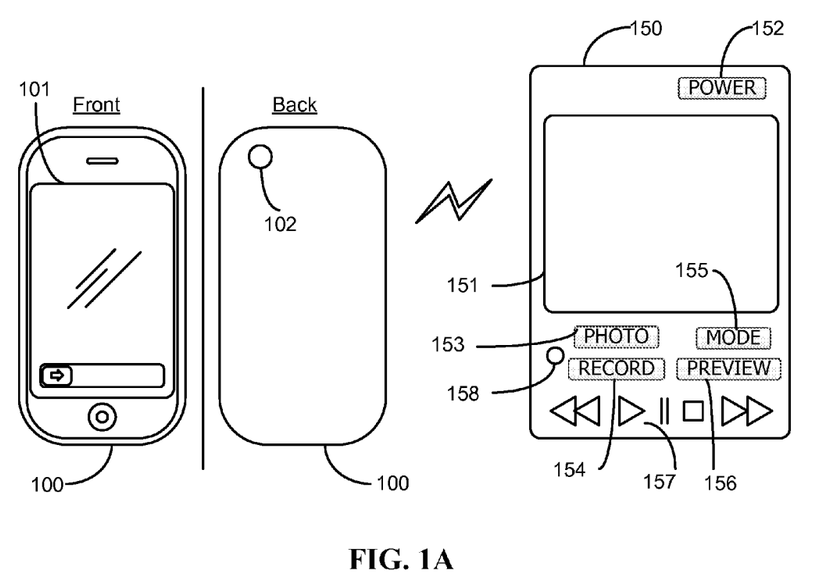
FIG. 1A illustrates a functional diagram of a portable media device coupled to an accessory according to an embodiment of the present invention.

FIG. 1A illustrates two views of portable media device (PMD) 100. PMD 100 can have the ability to record and store images in addition to the ability to play media tracks and perform other tasks. As illustrated in the front view, PMD 100 includes display 101. As illustrated in the back view, PMD 100 includes a camera 102. Camera 102 can have the ability to capture still images and record video. In some embodiments, the camera can support video recording in various resolutions, e.g. 640×480, various aspect ratios, e.g., 4:3 or 16:9, and various frame speeds e.g., 25 frames/sec. In some embodiments, the camera can capture still images of various resolutions depending on the image sensor of the camera. Display 101 can display the images captured by camera 102 in addition to other information. In some embodiments, PMD 100 may have a camera application (not shown) installed. The camera application can be implemented as a program that when executed provides a user interface through which a user may control and/or configure the camera. The camera application may accept the user input and control camera 102 accordingly. For example, the camera application may accept user input regarding changing the mode of camera 102 between still photo mode and video mode. The camera application may then place camera 102 in the desired mode and prepare camera 102 to capture an image. The camera application can also accept user input instructing the camera to capture the image.

In some embodiments, PMD 100 can communicate with a host computer (not explicitly shown) that executes an image management program. The image management program can allow a user to manage and/or organize the images taken by the camera. The management of the images can include, e.g., storing, deleting, or manipulating an image by subjecting the image to some form of image processing. In some embodiments, PMD 100 can communicate with accessory 150 that is capable of controlling camera 102.

Accessory 150 can provide capabilities related to remotely controlling camera 102 of PMD 100, for example, using wireless signals such as infrared, Bluetooth®, or the like. Accessory 150 can have a display 151 that is capable of displaying information received from PMD 100 including a still photo or video recording, in addition to other information. Accessory 150 can include power button 152 to turn the accessory on or off, photo button 153 to instruct camera 102 of PMD 100 to capture a still image, record button 154 to instruct camera 102 to capture video, mode button 155 to change the camera mode, and preview button 156 that can enable the display of an image captured by camera 102 on accessory display 151. In some embodiments, display 151 can also display various notifications regarding the camera state received from PMD 100. In some embodiments, accessory display 151 can be a touch screen that provides user operable interface elements. In some embodiments, photo button 153, record button 154, mode button 155, and preview button 156 may be provided as user operable interface elements on a touch screen display. Accessory 150 can also include a set of playback controls 157. Playback controls 157 can include individual controls for Rewind, Play, Pause, Stop, and Fast-forward. In some embodiments, playback controls 157 can be provided as user interface elements on a touch screen display. Accessory 150 may further include an indicator 158 that can illuminate when the accessory is in operation. For example, when accessory 150 is in an idle state (not providing instructions to the PMD) indicator 158 can be in an "off" state. In an embodiment, when accessory 150 sends an image capture command to PMD 100, indicator 158 can be in an "on" state reverting to the "off" state once the image is captured by PMD 100 and a notification to that effect is received by accessory 150 from PMD 100. In some embodiments, once accessory 150 sends a command to PMD 100 to start recording a video, indicator 158 can remain illuminated ("on") for the duration of the recording and revert to the "off" state once the recording is stopped and a notification to that effect is received by accessory 150 from PMD 100. In some embodiments, indicator 158 can be a light emitting diode (LED).

Figure 1B:
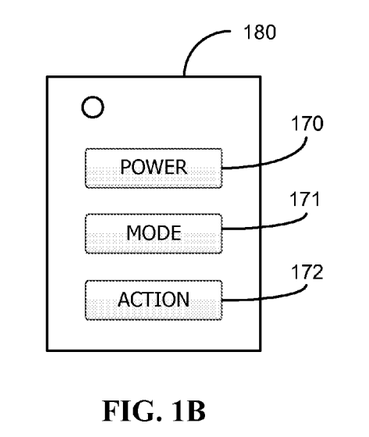
FIG. 1B illustrates an accessory according to an embodiment of the present invention.

FIG. 1B illustrates an accessory 180 according to an embodiment of the present invention. In this embodiment, accessory 150 can include a power button 170, a mode button 171, and an action button 172. Mode button 171 can be used to toggle the camera between the still photo mode and video mode. In some embodiments, mode button 171 is stateless and selecting this button will change the mode of the camera from a current mode to a different mode. For example, if the camera is in a still photo mode and mode button 171 is selected, the camera can transition to the video mode and vice versa. Action button 172 can assume various functions depending on the state of the camera. For example, if the camera is in the still photo mode, selecting Action button 172 can result in the camera taking a still photo, if the camera is recording a video and action button 172 is selected, the camera can stop recording the video. If the camera is in video mode but not recording video and action button 172 is selected, the camera can start recording video. Thus, action button 172 can itself be stateless in that the command communicated by the accessory via action button 172 can depend on the camera state.

It is to be noted that the PMD and accessory described above are illustrative. PMD 100 can be any device capable of storing and playing media and capturing still images and/or recording video. In some embodiments, PMD 100 can record audio along with the video and can have cellular phone capability. In some embodiments, accessory 150 can have different controls from the ones illustrated in FIG. 1A (e.g., fewer controls or additional controls such as save and delete). In some embodiments, accessory 150 may not have a display.

Figure 2:
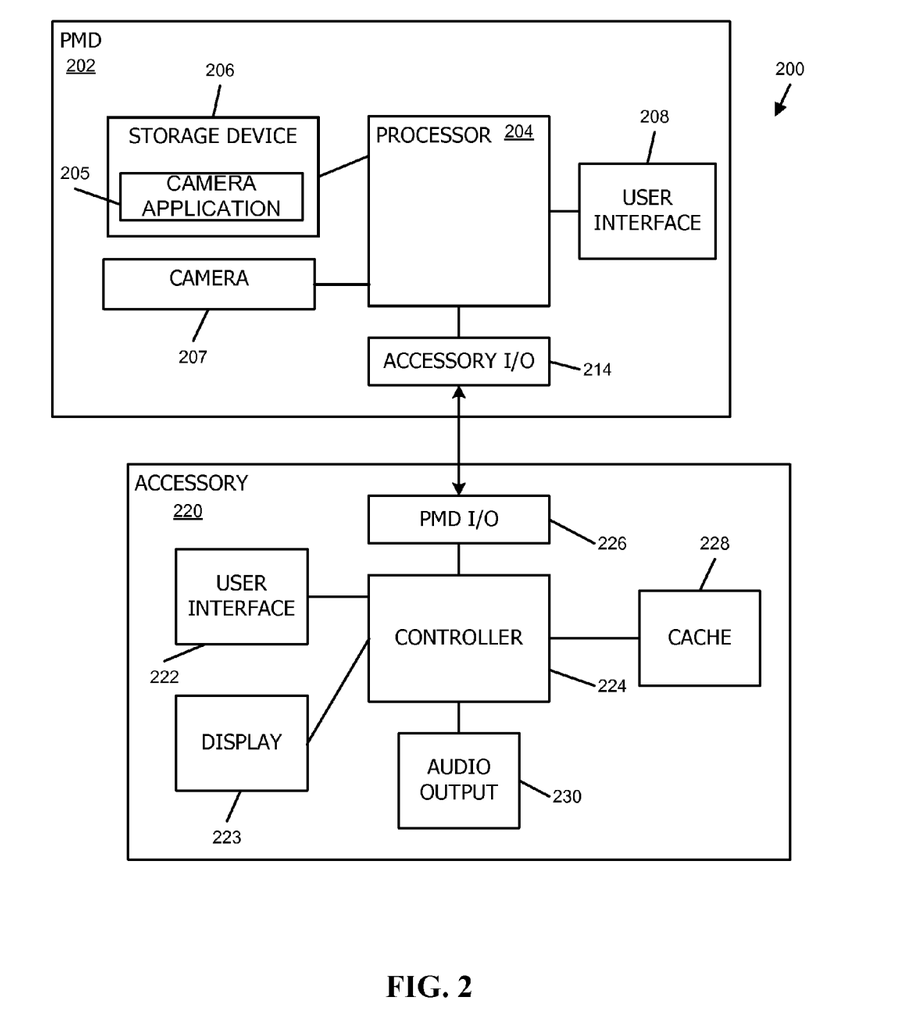
FIG. 2 is a block diagram of a system including a portable media device and an accessory according to an embodiment of the present invention.

FIG. 2 is a block diagram of system 200 according to an embodiment of the present invention. System 200 can include PMD 202 (e.g., implementing PMD 100 of FIG. 1A) and an accessory 220 (e.g., implementing accessory 150 of FIG. 1A).

PMD 202 in this embodiment can provide image capture capability. PMD 202 can include processor 204, storage device 206, camera 207, user interface 208, and accessory input/output (I/O) interface 214.

Camera 207 can capture still images and record video. Camera 207 can be equipped with various capabilities including zoom, focus, aperture control, shutter speed control, and the like. In some embodiments, camera 207 can be controlled using camera application 205, which can be, e.g., program code stored on storage device 206 and executed by processor 204. Camera application 205 can have a graphical user interface (GUI) associated with it that can provide the capability for a user to control various aspects of the camera. For example, camera application 205 may provide the capability to adjust the shutter speed for the camera, start and stop video recording, preview, save, or delete stored images, etc. In some embodiments, camera 207 can be concurrently controlled through user interface 208 and by accessory 220. In some embodiments, camera 207 may not be operable without first activating camera application 205.

Storage device 206 can be implemented, e.g., using disk, flash memory, or any other non-volatile storage medium. In some embodiments, storage device 206 can store media assets, such as audio, video, still images, or the like, that can be played by PMD 202, including images and videos previously captured by camera 207. Storage device 206 can also store user customized camera settings. Storage device 206 can store camera application 205, which can be used to control or otherwise operate camera 207. In some embodiments, storage device 206 may store a log of all activities related to the camera. For instance, the log can include a list of all instructions received from accessory 220 along with a time stamp or other identifying information or a list of all notifications sent by the PMD to the accessory.

Storage device 206 can also store other information such as information about a user's contacts (names, addresses, phone numbers, etc.), scheduled appointments and events, notes, and/or other personal information. In some embodiments, storage device 206 can store one or more other programs to be executed by processor 204 (e.g., video game programs, personal information management programs, image processing application, media playback programs, etc.).

User interface 208 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 208 to invoke the functionality of PMD 202 and can view and/or hear output from PMD 202 via user interface 208.

Processor 204, which can be implemented as one or more integrated circuits (e.g., a conventional microprocessor or microcontroller), can control the operation of PMD 202. For example, in response to user input signals provided by user interface 208, processor 204 can instruct camera 207 to capture an image. In some embodiments, processor 204 can also control user interface 208 to provide interfaces allowing the user to configure various camera settings, e.g., aperture size, shutter speed, using camera application 205. In some embodiments, processor 204 can instruct camera application 205 to operate camera 207 to capture an image and send the captured image to the accessory for preview. In some embodiments, processor 204 can communicate camera state change notifications to the accessory.

Accessory I/O interface 214 can allow PMD 202 to communicate with various accessories. For example, accessory I/O interface 214 might support connections to a remote control unit, an external speaker dock, an external video device, or the like. In some embodiments, accessory I/O interface 214 includes a 30-pin connector corresponding to the connector used on iPod® products manufactured and sold by Apple Inc. Alternatively or additionally, accessory I/O interface 214 can include a different connector and/or wireless interface (e.g., Bluetooth or the like).

Accessory 220 can include controller 224, user interface 222, PMD I/O interface 226, cache 228, and audio output device 230. Controller 224 can include, e.g., a microprocessor or microcontroller executing program code to perform various functions such as controlling camera 207, displaying images captured by camera 207, receiving notifications about camera state change from PMD 202, and the like. User interface 222 can include input controls such as a touch pad, touch screen, scroll wheel, click wheel, dial, button, keypad, microphone, or the like, as well as output devices such as video screen, indicator lights, or the like, together with supporting electronics (e.g., digital-to-analog or analog-to-digital converters, signal processors or the like). A user can operate the various input controls of user interface 222 to invoke the functionality of accessory 220 and can view output from accessory 220 via user interface 222 and hear output via audio output device 230. In addition, in some embodiments, a user can operate PMD 202 via user interface 222. PMD I/O interface 226 can allow accessory 220 to communicate with PMD 202 (or another PMD). Examples are described below.

Cache 228, which can be implemented using volatile and/or nonvolatile memory, provides storage for various information including information obtained from PMD 202. For example, in some embodiments, accessory 220 can obtain notifications related to camera 207 and images captured by camera 207 from PMD 202. Any or all of this information can be stored in cache 228. Accessory 220 can be a simple remote control without video display, audio output, or cache.

Audio output device 230 can include one or more speakers or driver circuits and connectors for external speakers, thereby enabling audio to be presented to a user. In some embodiments, controller 224 can receive an audiovisual recording from PMD 202 via PMD I/O interface 226 and can provide the audio signals associated with the video with or without further processing to audio output device 230. Audio output device 230 can transform the signals as appropriate for presentation to the user.

It will be appreciated that the system configurations and components described herein are illustrative and that variations and modifications are possible. The PMD and/or accessory can have other capabilities not specifically described herein. For example, PMD 202 can play stored media such as songs, audio books, videos, including media obtained from sources other than camera 207. In some embodiments, the accessory can be used to control a camera in the PMD remotely and operate the camera to capture still photos or videos. For example, the accessory can send various commands to the PMD in order to operate the camera and can receive camera related notifications from the PMD. In some embodiments, the camera can be concurrently operated using the accessory and the PMD.

Further, while the PMD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Accessory I/O interface 214 of PMD 202 and PMD I/O interface 226 of accessory 220 allow PMD 202 to be connected to accessory 220 and subsequently disconnected from accessory 220. As used herein, PMD 202 and accessory 220 are "connected" whenever a communication channel between accessory I/O interface 214 and PMD I/O interface 226 is open and are "disconnected" whenever the communication channel is closed. Connection can be achieved by physical attachment (e.g., between respective mating connectors of PMD 202 and accessory 220), by an indirect connection such as a cable, or by establishing a wireless communication channel. Similarly, disconnection can be achieved by physical detachment, disconnecting a cable, powering down accessory 220 or PMD 202, or closing the wireless communication channel. Thus, a variety of communication channels can be used, including wired channels such as USB, FireWire, or universal asynchronous receiver/transmitter ("UART"), or wireless channels such as Bluetooth and Wi-Fi. In some embodiments, multiple communication channels between a PMD and an accessory can be open concurrently, or a PMD can be connected to multiple accessories, with each accessory using a different communication channel.

Regardless of the particular communication channel, as long as PMD 202 and accessory 220 are connected to each other, the devices can communicate by exchanging commands and data according to a PMD-specific protocol. The PMD specific protocol can define a format for sending messages between PMD 202 and accessory 220. For instance, the specific protocol can specify that each message be sent in a packet with a header and an optional payload. The header provides basic information (e.g., a start indicator, length of the packet, and a command to be processed by the recipient), while the payload provides any data associated with the command; the amount of associated data can be different for different commands, and some commands can provide for variable-length payloads. In various embodiments, the PMD-specific protocol can define specific commands to indicate an action to be taken by the recipient; to signal completion of a task, change of state, or occurrence of an error; and/or to identify the nature of the associated data. In some embodiments, the commands can be defined such that a particular command is valid in only one direction. The packet can also include error-detection or error-correction codes as known in the art.

The PMD-specific protocol can define a number of "lingoes," where a "lingo" is a group of related commands that can be supported (or unsupported) by various classes of accessories. In some embodiments, a command can be uniquely identified by a first byte identifying the lingo to which the command belongs and a second byte identifying the particular command within the lingo. Other command structures can also be used. It is not required that all accessories, or all PMDs to which an accessory can be connected, support every lingo defined within the PMD-specific protocol.

In some embodiments, every accessory 220 and every PMD 202 that are designed to be interoperable with each other support at least a "general" lingo that includes commands common to all such devices. The general lingo can include commands enabling the PMD and the accessory to identify themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) can be blocked from invoking certain commands or lingoes if the authentication is unsuccessful.

In some embodiments the general lingo can also provide a notification capability. For example, PMD 202 can generate notifications in response to various events that change the status of PMD 202, such as launching or exiting various applications (e.g., camera application 205), changing state within an application (e.g., changing between still-photo and video modes), and so on. Accessory 220, when connected to PMD 202, can "register" to receive all notifications or selected classes of notifications by sending a registration command to PMD 202; an example is described below. Once accessory 220 has registered for a particular class (or classes) of notifications, PMD 202 automatically begins to send notifications to accessory 220 whenever any event within the registered class(es) occurs. Notification conveniently allows accessory 220 to maintain current information about the status of PMD 202 without having to send requests for status information. In some embodiments, the notifications about the changes in camera state can be communicated to the accessory asynchronously. Camera 207 can change states independent of accessory 220 and accessory can get notified of the change in state asynchronously.

A PMD-specific protocol can also include various other lingoes, such as a simple remote lingo that allows accessory 220 to send a command indicating a function of PMD 202 to be invoked, a remote user interface lingo that can be used to communicate commands and data related to replicating all or part of a user interface of PMD 202 on accessory 220 (thereby supporting a more advanced remote control), a camera lingo that allows accessory 220 to control various settings of camera 207, a storage lingo that allows accessory 220 to store data on PMD 202, and so on. Any lingo or combination of lingoes or other commands or groups of commands can be used in connection with a PMD-specific protocol.

PMD State Diagram

Figure 3:
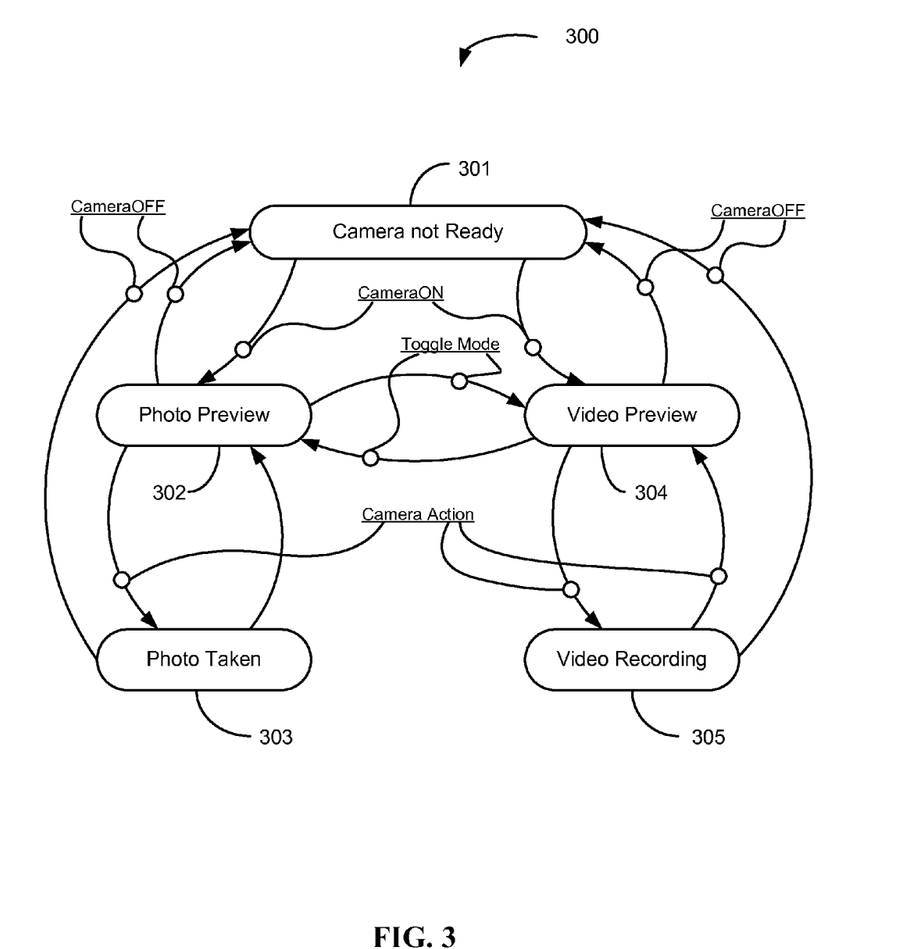
FIG. 3 illustrates a sample state diagram for a portable media device according to an embodiment of the present invention.

FIG. 3 is a simplified state diagram 300 for PMD 202 illustrating aspects of operation of camera 207 according to an embodiment of the present invention. When PMD 202 is turned on or when the camera is inactive, PMD 202 can be in a Camera not Ready state 301. When a "CameraON" event occurs, PMD 202 transitions to either Photo Preview state 302 or video preview state 304. In some embodiments, PMD 202 may remember the last camera state prior to exiting camera operation and transition to that camera state, e.g., video preview, on occurrence of the CameraON event. The CameraON event can occur in response to any user input indicating that the user desires to start the camera. For example, the user may activate a camera icon on a graphical user interface of PMD 202 or operate a control of accessory 220 that causes accessory 220 to send a command to PMD 202 to launch camera application 207.

In Photo Preview state 302, PMD 202 can receive input for operating the camera to take a still image, change the camera settings, e.g., focus, zoom, etc., review previously captured images, change camera mode, and the like. In some embodiments, PMD 202 can remain in the Photo Preview state 302 until the camera application quits, e.g., "CameraOFF" event, or PMD 202 receives a command to change camera mode. In the event that PMD 202 receives a command to capture a still image, e.g., "CameraAction" event, PMD 202 transitions to Photo Taken state 303 to capture the current image from the camera sensor into memory or other storage medium. In some embodiments, upon capturing the still image, PMD 202 returns to Photo Preview state 302.

In some embodiments, when PMD 202 is in Photo Preview state 304, it can receive a command to change the camera mode, resulting in a "ToggleMode" event. The ToggleMode event can occur in response to a command received from accessory 220 or via the user interface of PMD 202 to change the camera mode. Upon occurrence of the ToggleMode event, PMD 202 transitions to Video Preview state 304. Similarly, if PMD 202 is in Video Preview state 304 and the ToggleMode event occurs, PMD 202 transitions to Photo Preview state 302.

In Video Preview state 304, PMD 202 can receive input for operating the camera to capture video, changing camera settings, changing camera mode, or turning the camera off. If PMD 202 receives a command to capture video, e.g., CameraAction event, PMD 202 transitions to Video Recording state 305. PMD 202 can stay in Video Recording state 305 until it receives a command to stop recording the video, e.g., CameraAction event, or camera application 205 is turned off, e.g., CameraOFF event.

It will be appreciated that the various states described in reference to FIG. 3 are for illustrative purposes only. Once skilled in the art will realize that various other states are possible depending on the PMD capabilities.

Accessory State Diagram

Figure 4:
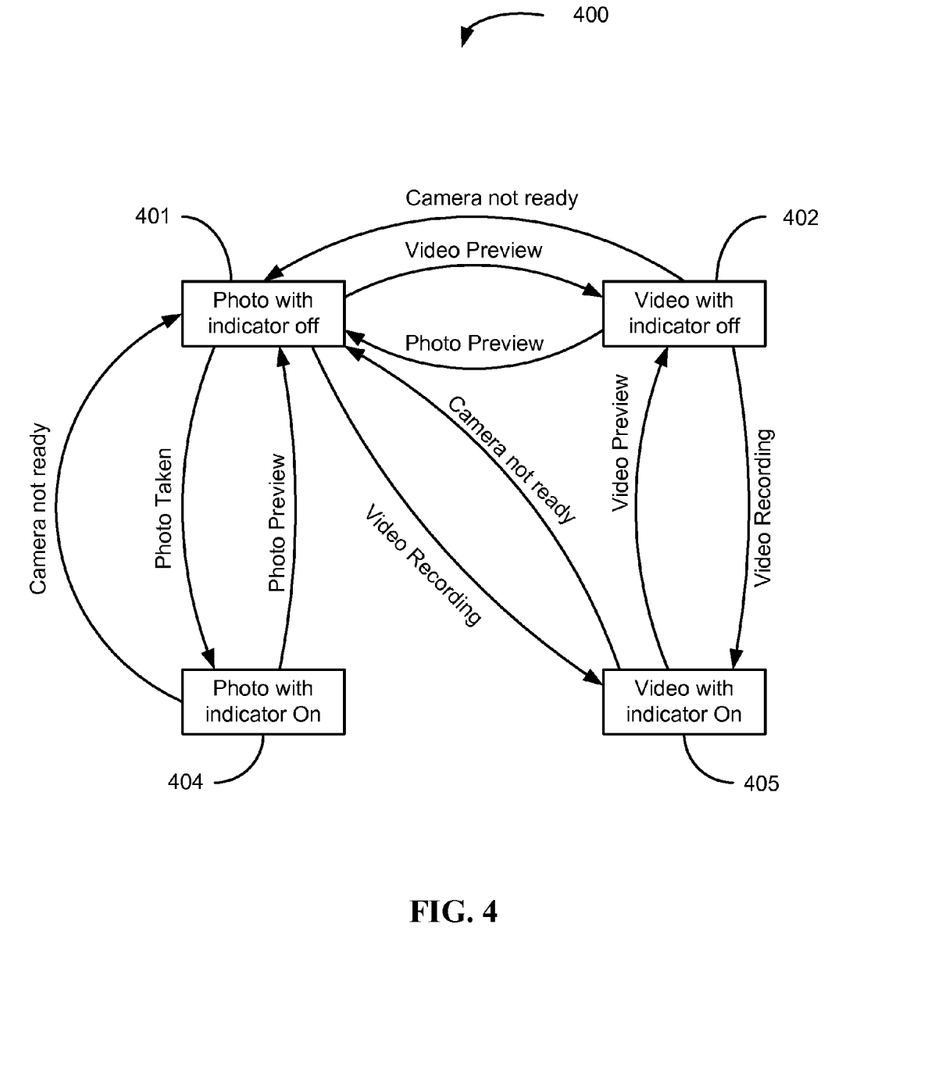
FIG. 4 illustrates a sample state diagram for an accessory according to an embodiment of the present invention.

FIG. 4 is a simplified state diagram 400 for accessory 220 illustrating aspects of operation of camera 207 and its relation to the accessory states, according to an embodiment of the present invention. When accessory 220 is powered on, reset, or initially connected to PMD 202, it can be in Photo with Indicator OFF state 401. In some embodiments, accessory 220 can remember the state it was in just prior to last power down, reset, etc. and transition to that state upon power on or reset. In the embodiment illustrated in FIG. 4, Photo with Indicator OFF state 401 is designated as the "default" state for accessory 220 for ease of explanation. Accessory 220 can transition to any of the other states from this default state upon receiving notification of occurrence of the appropriate event from PMD 202. It should be understood that accessory 220 can be programmed to be in a different state upon power up and/or reset.

Accessory 220 can transition to different states in response to notifications of events from PMD 202. For example, in Photo with Indicator OFF state 401, if accessory 220 receives a notification from PMD 202 that camera 207 has transitioned to the Photo Taken state, accessory 220 can transition to Photo with Indicator ON state 404. In some embodiments, the indicator on accessory 220 may flash briefly or turn on as the accessory transitions to Photo with Indicator ON state 404. Once camera 207 captures the still image and notifies the accessory that it has transitioned back to photo preview state, accessory 220 can transition back to Photo with Indicator OFF state 401; this transition can include turning off the indicator. In some embodiments, the transitions from Photo with Indicator OFF state 401 to Photo with Indicator ON state 404 and back again may occur quickly so that the indicator flashes briefly.

If, while accessory 220 is in Photo with Indicator OFF state 401, it receives notification that camera 207 has changed its state to Video Preview, accessory 220 can transition to Video with Indicator OFF state 402. As described above, camera 207 may change its state based on instructions received from accessory 220 or PMD 202. In the Video with Indicator OFF state 402, accessory 220 can receive a notification from PMD 202 that may cause accessory 220 to change to Photo with Indicator OFF state 401, e.g., camera mode change or camera off notification. In addition, while in Video with Indicator OFF state 402, if accessory 220 receives notification that camera 207 has begun to capture a video, e.g., video recording notification, accessory 220 can transition to Video with Indicator ON state 405. In some embodiments, accessory 220 can transition directly to Video with Indicator ON state 405 from Photo with Indicator OFF state 401 upon receiving an appropriate notification from PMD 202.

It will be appreciated that the various states described in reference to FIGS. 3 and 4 are for illustrative purposes only. One skilled in the art will realize that various other states are possible depending on the accessory capabilities.

In some embodiments, accessory 220 can be stateless in that the accessory may not have states that correspond to the states of the camera. For example, the camera may change states as illustrated in FIG. 3, but there may not be any corresponding state changes for the accessory. The commands sent by the accessory will operate the camera based on the state of the camera without the accessory providing specific commands. For example, if the camera is in a photo preview state, pressing the action button on accessory 150 of FIG. 1B can result in the camera capturing an image without the accessory specifically instructing the camera to capture an image. The accessory can operate independent of the camera state. If the camera is in photo preview state and the mode button on the accessory is selected, the accessory can send a command to the camera to change modes without knowing the current camera mode or specifying a particular new mode for the camera. In some embodiments, the camera can change states without any instructions from the accessory, e.g., by receiving instructions from the PMD user interface.

Figure 5:
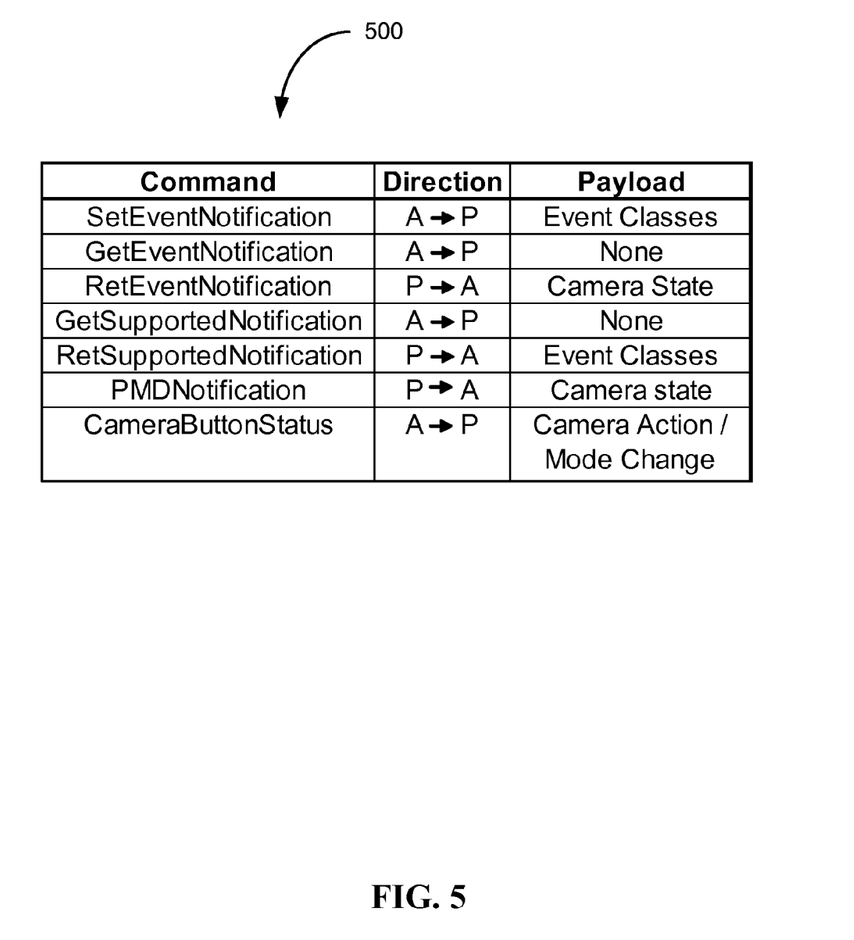
FIG. 5 is a table listing commands that can be used to exchange information between a portable media device and an accessory according to an embodiment of the present invention.

FIG. 5 shows table 500 listing commands that can be used to control a camera included in a PMD according to an embodiment of the present invention. These commands can be incorporated into a camera lingo (or other group of commands) within a communication protocol supported by the PMD and the accessory, thereby allowing the PMD and the accessory to exchange information related to the camera.

The SetEventNotification command can be sent by accessory 220 to PMD 202 to register for notifications of various changes to the PMD's state. In one embodiment, the payload of the SetEventNotification command includes a bitmask in which each bit is associated with a different class of notifications. For example, if PMD 202 has multiple functions, the notifications can be grouped into classes according to function (e.g., camera, stored media playback, telephony, data network access, navigation, etc.), and accessory 220 can register for classes that will affect its operation. Thus, for example, an accessory that can control camera functionality can register for camera notifications without receiving, e.g., telephony or navigation notifications. In some embodiments, PMD 202 can return an acknowledgement (not explicitly shown in FIG. 3) to confirm receipt of the SetEventNotification command.

The PMDNotification command can be sent by PMD 202 to accessory 220 to notify accessory 220 of a state transition or other event that may affect operation of the accessory. The payload can include a notification message indicating the type of event (e.g., using a byte code) and optionally other information that depends on the type of event. In some embodiments, PMD 202 sends notifications only for events in a class for which the accessory has registered using the SetEventNotification command. For example, in one embodiment, there can be defined a "camera" class of notifications. The camera class can include notifications corresponding to, e.g., the CameraON and CameraOFF events of FIG. 3, as well as notifications related to operation of camera such as capturing a still image or starting and stopping a video recording. In particular, in some embodiments, notifications can be sent for each CameraAction event shown in FIG. 3.

The CameraButtonStatus command can be sent from the accessory to the PMD to provide an instruction for operating the camera. The payload of this command can include a bit mask in which different bits map to different camera operations. For example, one bit may map to a camera mode toggle between video and still photo modes and another bit may map to a Camera Action operation. The command can be used to send the desired instruction by setting the corresponding bit (s) in the bitmask. For instance, the CameraButtonStatus command can be used to toggle the camera mode between Photo Preview and Video Preview by setting the appropriate bit in the bit mask. In some embodiments, this command can be used to instruct the camera to capture a still photo or record a video depending on the mode of the camera. For instance, if a user of the accessory desires to capture a still photo but the PMDNotification command indicates that the camera is in a Video Preview mode, the user can instruct the accessory to send the CameraButtonStatus command with the appropriate bit set to toggle the camera mode to Photo Preview mode. Once the PMD confirms the change in mode via the PMDNotification command, the accessory can send the CameraButtonStatus command with the bit corresponding to Camera Action being set. The camera can then capture a still image. A single Camera Action bit of the CameraButtonStatus command can be associated with multiple camera operations such as taking still photo if the camera is in Photo Preview mode, starting video recording if the camera is in Video Preview mode, and stopping video recording if the camera is in Video Recording mode.

It will be appreciated that the commands described herein are illustrative and that variations and modifications are possible. For instance, additional commands can be used to facilitate communication of camera state information and operation instructions between the PMD and the accessory. For example, the accessory can send a GetEventNotification command to the PMD to confirm the event classes for which the accessory is currently registered to receive notifications. The PMD can respond with a RetEventNotification command informing the accessory about the event classes that the accessory is currently registered for and if the currently registered event classes are not the ones the accessory wishes to remain registered for, the subscription of the event classes can be changed, e.g., using the SetEventNotification command. In some embodiments, the accessory may query the PMD about all the event classes that the PMD supports for providing notifications, e.g., using a GetSupportedEventNotification command. The PMD may respond with a RetSupportedEventNotification command. The payload of the RetSupportedEventNotification command can include a bitmask indicating all possible event classes for which the PMD can generate notifications. In some embodiments, each bit of the bitmask can correspond to an event or an event class. Further, not all of the commands described herein need be supported, and other protocols can be used.

In some embodiments, PMD 202 can generate camera state notifications and communicate the notifications to the accessory. In some embodiments, these notifications are provided to the accessory asynchronously, i.e., without the accessory requesting the notification. In some embodiments, before PMD 202 can send the camera state notifications, the accessory may have to register with PMD 202, e.g., using the SetEventNotification command, to receive the notifications. Once the accessory registers with PMD 202, it can automatically receive notifications about changes in the state of the camera. Camera state notifications can include information about, camera mode (photo or video), camera operation (video recording in progress, photo taken, etc.), camera status (active (on) or inactive (off)), whether the camera application is currently running or not, etc. Every time there is change in the state of the camera, PMD 202 can send a notification to the accessory. In some embodiments, a notification regarding camera state may be sent to the accessory even if a command to change the camera state does not result in an actual change of state of the camera. In addition, in some embodiments additional commands can be provided to allow accessory 220 to direct camera application 205 to control various settings of the camera including, zoom, shutter speed, aperture size, flash, focus, and the like.

Figure 6:
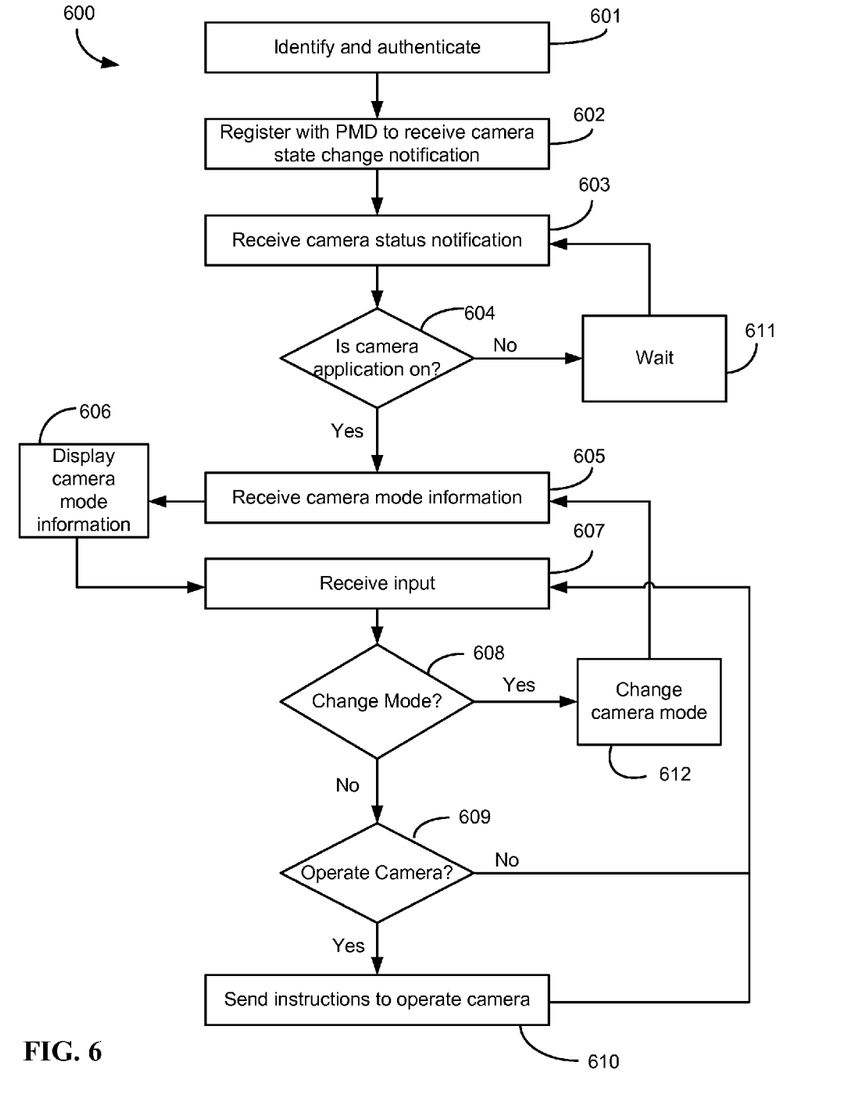
FIG. 6 is a flow diagram of a process that can be used by an accessory to control a camera included in a portable media device according to an embodiment of the present invention.

FIG. 6 is a flow diagram of a process 600 that can be used by an accessory to control a camera included in a portable media device according to an embodiment of the present invention. Process 600 can be performed, e.g., by accessory 220 of FIG. 2. At block 601, the PMD can authenticate and identify the accessory, e.g., using one or more commands from the general lingo described above. Once the accessory is authenticated, it can exchange information with the PMD. In some embodiments, during identification at block 601, accessory 220 can specify a preferred initial state for PMD 202 (e.g., whether PMD 202 should enter camera mode), and block 601 can also include receiving confirmation that the preferred state has been entered.

At block 602, the accessory can register with the PMD for receiving camera state notifications e.g., by sending the SetEventNotification command with appropriate parameters. At block 603, the accessory can receive a camera state change notification from the PMD indicating the current state of the camera e.g., via the PMDNotification command. At block 604, the accessory can analyze the received notification to check whether the camera application is currently active. If it is determined that the camera application is not currently active, the accessory can wait at block 611 until another notification is received and process 600 returns to block 603. In an alternative embodiment, if at block 604, it is determined that the camera application is not active, the accessory can send a command to the PMD to activate the camera application, e.g., by using the CameraButtonStatus command. In some embodiments, this command can be sent automatically by the accessory or in response to user input requiring camera activation. Once it is determined, at block 604, that the camera application is active, the accessory can receive current camera mode information at block 605 e.g., via the PMDNotification command.

Once the current camera mode is received by the accessory, the accessory can present the current mode information at block 606, e.g., on its display, and wait for further input. At block 607, the accessory can receive input, e.g., from a user operating the accessory. Once the accessory receives an input, the accessory can check, at block 608, to determine if the input corresponds to a request to change the camera mode. If it is determined that the input is not to change the camera mode, processing can proceed to block 609. If it is determined that the input is a request to change camera mode, the accessory can send instructions to the PMD to change the camera mode at block 612, e.g., using the CameraButtonStatus command. In some embodiments, block 612 can include receiving notification of the new camera mode. Once the accessory sends the instruction to change camera mode at block 612, process 600 can return to block 605 where the PMD can receive notification of the camera mode change and then await further inputs at block 607.

At block 609, the accessory can check whether the received input corresponds to an instruction for operating the camera. If it is determined that the received input corresponds to an instruction for operating the camera, the accessory can send instructions to the PMD to operate the camera at block 610, e.g., using the CameraButtonStatus command. For example, the instructions to operate the camera can include instructions to change camera settings or instructions to capture an image. After sending the instructions to the PMD and receiving response from the PMD, process 600 can return to block 607 to await further input. If at block 609, it is determined that the received input is not to operate the camera, process 600 can return to block 607 and the accessory can check whether it has received any new input. Process 600 can continue until the accessory is disconnected from the PMD. In some embodiments, at block 607, instead of a user input, the input received can be a notification regarding change in the camera state. For example, if a user instructs the camera to capture an image by operating the user interface of the PMD after the accessory has received the camera mode information, e.g., Photo Preview, at block 605, the input received at block 607 can be the new camera state e.g., Photo Taken.

It will be appreciated that process 600 described herein is illustrative and that variations and modifications are possible. Acts described as sequential can be executed in parallel, order of acts can be varied, and acts can be modified or combined. For instance, the accessory may send the command to change the camera mode to a desired mode before the PMD sends a notification about the current camera mode. In some embodiments, the accessory may not wait for the PMD to confirm a mode change before sending the instructions to operate the camera. In some embodiments, after the camera captures an image, the PMD may send the picture to the accessory for display on the accessory either automatically or in response to an image request command sent by the accessory. In some embodiments, the accessory may provide disposition instructions for the image to the PMD once it is previewed, e.g., store the image, delete the image, etc.

Figure 7:
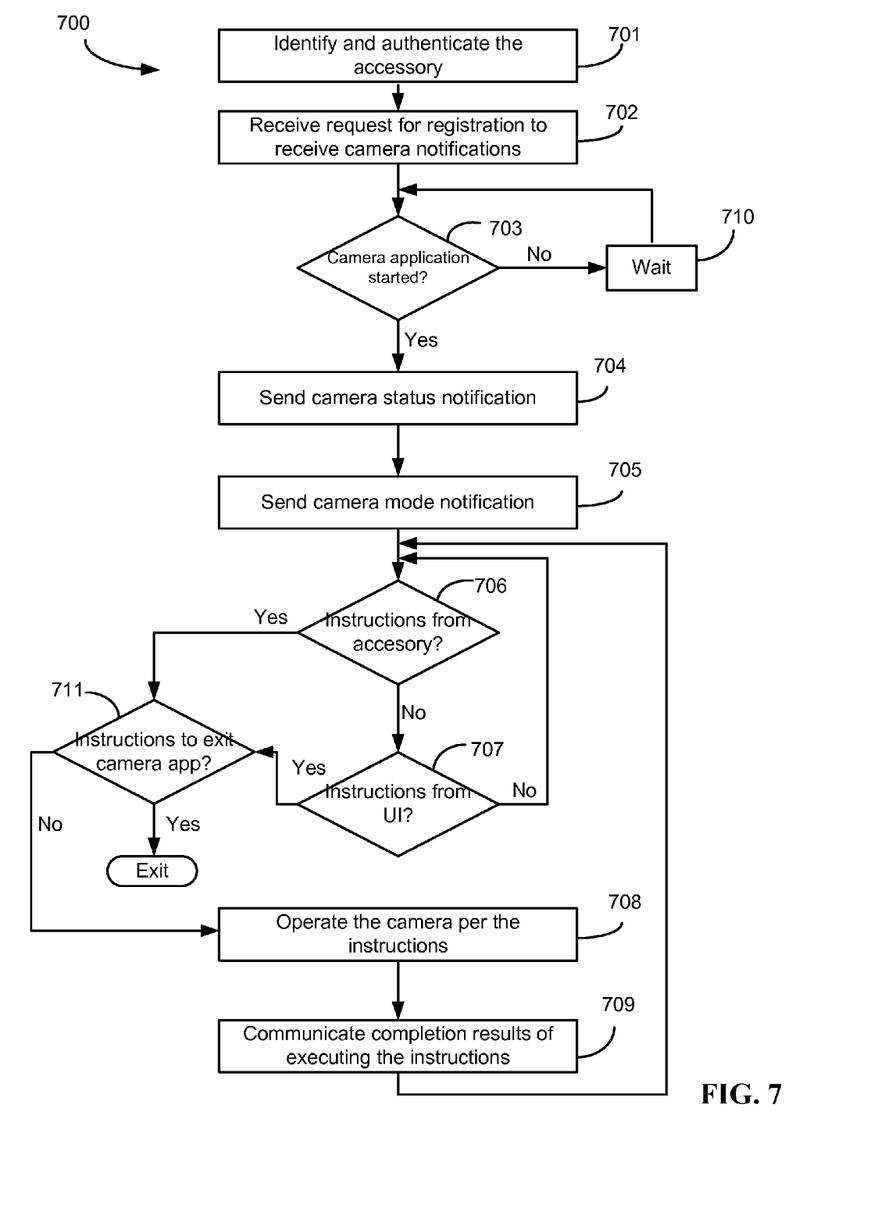
FIG. 7 is a flow diagram of a process that can be used by a portable media device to communicate with an accessory to control a camera included in the portable media device according to an embodiment of the present invention.

FIG. 7 is a flow diagram of a process 700 that can be used by a portable media device to communicate with an accessory to control a camera included in the portable media device according to an embodiment of the present invention. Process 700 can be performed, e.g., by PMD 202 of FIG. 2. At block 701, the PMD can identify and authenticate the accessory, e.g., by using the commands in the general lingo. Once authenticated, the accessory can exchange information with the PMD. In some embodiments, accessory 220 can indicate that PMD 202 should initialize in the camera ON mode, e.g., during identification at block 701.

At block 702, the PMD can receive a request from the accessory to be registered to receive camera notifications, e.g., by using the SetEventNotification command. In some embodiments, the PMD may send an acknowledgement command to indicate that the request has been successfully received. In some embodiments, the PMD can also send current camera state information to the accessory, e.g., via the PMDNotification command, as a reply to the SetEventNotification command. At block 703, the PMD can verify whether the camera application is currently active. If it is determined that the camera application is not currently active, process 700 can wait for the camera application to be started at block 710. In some embodiments, the PMD can generate a notification indicating that the camera application is currently off. In some embodiments, a user operating the PMD through its user interface can start the camera application. In an alternative embodiment, the accessory can remotely start the camera application.

If it is determined at block 703 that the camera application is currently active, or upon activation of the camera application, the PMD can send a camera state notification to the accessory, at block 704, indicating the change in status of the camera application. At block 705, the PMD may send a notification to the accessory indicating the current camera mode, e.g., still photo or video. In some embodiments, the camera application controls the mode selection and reports the mode to the PMD's operating system to facilitate notification to the accessory. At block 706, the PMD can check whether it has received any instructions from the accessory to operate the camera. As described above, in some embodiments, the camera can be concurrently controlled by the accessory and the PMD. If it is determined at block 706 that PMD has received instructions from the accessory, the PMD can check, at block 711, whether the instructions are to exit the camera application. If the instructions are to exit the camera application, process 700 ends. If the instructions do not correspond to exiting the camera application, the PMD can execute the instructions and operate the camera accordingly at block 708. In some embodiments, the instructions can be to change the mode of the camera by toggling between the still photo and video modes. In some embodiments, the instructions from the accessory can be to capture an image using the current mode of the camera. In yet other embodiments, the instructions can include adjustments to camera settings such as zoom, focus, aperture size, or shutter speed.

If it is determined at block 706 that no instructions have been received from the accessory, the PMD can check whether it has received instructions for operating the camera through the PMD user interface at block 707. If it is determined that instructions have been received through the PMD user interface, the PMD can operate the camera according to the instructions, at block 708. As described above, the instructions can include instructions for capturing an image, instructions for adjusting camera settings, or instructions for disposition of the images previously captured. In some embodiments, process 700 can check, at block 711, whether the instructions received from the PMD user interface are to exit the camera application and proceed accordingly if the instructions are to exit the camera application. If the instructions are not to exit the camera application, PMD can operate the camera based on the instructions at block 708. If it is determined, that no instructions are received at block 707, process 700 can wait to receive instructions from the accessory or through the PMD user interface and the process can return to block 706. Upon executing the instructions received from either the accessory or the PMD user interface, the PMD can communicate the results of executing the instructions to the accessory and/or the PMD user interface at block 709. In some embodiments, the PMD can send any images captured by the camera to the accessory for preview by the accessory, either automatically or in response to requests from the accessory. The accessory may then send instructions regarding disposition of the image to the PMD.

It will be appreciated that process 700 described herein is illustrative and that variations and modifications are possible. Acts described as sequential can be executed in parallel, order of acts can be varied, and acts can be modified or combined. For instance, the PMD may send a camera notification along with the acknowledgement message for the request received at block 702 instead of sending the camera notification as a separate message.

It is to be noted that FIGS. 6 and 7 illustrate one possible sequence of events for controlling the camera by the accessory and the PMD, respectively and include sample camera state transitions that can occur during the respective processes. One skilled in the art will realize that other methods for camera control are possible that may include different camera state transitions and/or sequences of transitions than the ones illustrated.

Embodiments described herein provide for control of a camera included in a PMD. In some embodiments, the accessory may register with the PMD to receive camera notifications. Once registered, the accessory can automatically receive camera notifications every time there is a change in the camera state, without having to query the PMD for the current state. In some embodiments, the notifications can include camera status change (e.g., active or inactive), camera mode change (e.g., still photo or video), or camera control information (focus, zoom, aperture size, etc.). In some embodiments, the accessory can remotely activate the camera by starting a camera application on the PMD that controls the camera, remotely change the camera mode, and remotely provide instructions to operate the camera. In some embodiments, the accessory and the PMD can concurrently control the camera, i.e., both the PMD and the accessory can send instructions to operate the camera concurrently. For example, a user can start video recording by operating the PMD user interface and stop the video recording using the accessory, a user can set the camera mode from the accessory and take a photo/start recording from the PMD user interface. In some embodiments, the PMD may not allow conflicting commands to be sent to the camera. For example, if the accessory attempts to change the camera mode to still mode while the camera is recording a video, the mode change command can be blocked by the PMD and the accessory notified accordingly. In some embodiments, the PMD may send the image captured by the camera to the accessory for viewing purposes. In some embodiments, the accessory may instruct the PMD about disposition of images captured and/or stored on the PMD.

In some embodiments, the camera can be external to the PMD while the camera application can be resident on the PMD. In this instance, the camera can still be controlled using the accessory via the camera application using the above-mentioned methods. In some embodiments, the external camera can be connected to the accessory I/O interface or a different interface. A camera application resident on the PMD can be operated to send control signals to the external camera in order to operate the camera. In some embodiments, the external camera can be concurrently controlled using the accessory and the PMD.

While the invention has been described with respect to specific embodiments, those skilled in the art will recognize that numerous modifications are possible. For instance, the accessory can send instructions to the PMD to instruct the PMD to present a slide-show of the images stored on the PMD. In some embodiments, the accessory can store images captured by the camera in its cache and these images can be shared with other accessories and/or PMDs. In some embodiments, the accessory can be programmed to send the CameraButtonStatus command to the PMD periodically, e.g., every 1 sec, for capturing a series of still images over a predetermined period. In some embodiments, the accessory can send a single instruction to the PMD to capture a series of images at a certain frequency over a given period, e.g., capture an image every 200 seconds over a period of 1 hour. In some embodiments, the PMD may have an illuminating device, e.g., a light emitting diode (LED) that can be used to provide additional lighting in low light environments to facilitate image capture. The illuminating device may work in conjunction with or in lieu of a flash that may be included in the PMD. In some embodiments, the illuminating device can be controlled by the accessory, e.g., by sending a CameraButtonStatus command with a bitmask bit set to toggle the illuminating device on or off.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

The invention claimed is:

1. A method comprising:
   sending, by an accessory to a portable device having a camera that is concurrently operable in response to commands from the accessory and signals from a user interface of the portable device, a request to register for camera status notifications to be sent by the portable device in response to processing the commands from the accessory and the signals from the user interface for the portable device;
   receiving, by the accessory from the portable device, a first camera status notification identifying a current camera mode from a plurality of camera modes, the plurality of camera modes including a still-image mode in which the camera of the portable device is ready to capture a still image and a video mode in which the camera of the portable device is ready to record a video;
   receiving, by the accessory, a first user input indicating that the current camera mode should be changed;
   in response to the first user input, sending, by the accessory, a mode change command to the portable device;
   receiving, by the accessory from the portable device, a second camera status notification identifying an updated camera mode;
   receiving, by the accessory, a second user input indicating that an image capture operation should be performed;
   in response to the second user input, sending, by the accessory, an image capture command to the portable device; and
   receiving, by the accessory, a third camera status notification indicating that an image capture operation has been performed, wherein the third camera status notification includes either an indication that a still image has been captured or an indication that recording of a video has been started.

2. The method of claim 1 further comprising:
   in response to receiving the third camera status notification, presenting an output to the user indicating that the image capture operation has been performed.

3. The method of claim 2 wherein presenting the output to the user includes illuminating a visual indicator.

4. The method of claim 3 wherein, in the event that the third camera status notification includes the indication that recording of a video has been started, the visual indicator remains illuminated until a fourth camera status notification is received, the fourth camera status notification including an indication that recording of the video has been stopped.

5. The method of claim 1 wherein, in the event that the second user input is received before the second camera status notification is received, the accessory waits to send the image capture command until the second camera status notification is received.

6. The method of claim 1 further comprising:
   in response to receiving the second camera status notification, presenting an output to the user indicating the updated camera mode.

7. An accessory comprising:
   a user interface including a first input control operable as a camera mode button and a second input control operable as a camera action button;

a device interface to communicate with a portable device having a camera that is concurrently operable in response to commands from the accessory and signals from a user interface of the portable device; and a processor coupled to the user interface and the device interface, wherein the processor is configured to communicate with the portable device via the device interface using a plurality of commands, the plurality of commands including:

a first command sendable by the accessory, the first command requesting registration for camera status notifications;

a second command receivable by the accessory, the second command including a camera status notification, wherein the camera status notification includes information indicative of a current operational state of the camera of the portable device and wherein receipt of the second command informs the processor that the operational state of the camera has changed; and a third command sendable by the accessory responsive to user operation of the first or second input control, the third command including either an indication that the user has operated the camera mode button or an indication that the user has operated the camera action button, wherein the second command is receivable asynchronously with respect to sending of the third command.

8. The accessory of claim 7 wherein the information indicative of the current operational state of the camera includes a current camera mode identifier selected from a plurality of camera modes identifiers, the plurality of camera mode identifiers including a still-mode identifier indicating that the camera is ready to capture a still image and a video-mode identifier indicating that the camera is ready to record a video.

9. The accessory of claim 7 wherein the user interface further includes a visual indicator and wherein the processor is further configured to illuminate or de-illuminate the visual indicator in response to receiving the second command.

10. The accessory of claim 7 wherein the information indicative of the current operational state of the camera includes information indicating whether the camera is active or inactive.

11. The accessory of claim 10 wherein the plurality of commands further includes:

a fourth command sendable by the accessory to instruct the portable device to activate the camera.

12. A method comprising:

receiving, by a portable device having a camera and a user interface, a request from an accessory to register for camera status notifications;

determining, by the portable device, a current camera mode of the camera, the current camera mode selected from a plurality of camera modes including a still-image mode in which the camera is ready to capture a still image and a video mode in which the camera is ready to record a video;

sending, by the portable device to the accessory, a first camera status notification identifying the current camera mode;

receiving, by the portable device, a mode change command from the accessory;

in response to the mode change command, changing the current camera mode to a next one of the plurality of camera modes, and sending to the accessory a second camera status notification indicating the changed current camera mode;

receiving, by the portable device, a first instruction to capture an image, wherein the first instruction to capture an image is received as either an image capture command from the accessory or an image capture signal from the user interface of the portable device; and in response to the first instruction to capture an image:

capturing a first still image in the event that the first image capture command is received while the current camera mode is the still-image mode;

beginning to record a video in the event that the first image capture command is received while the current camera mode is the video mode; and sending, to the accessory, a third camera status notification indicating that a first image capture operation has been performed.

13. The method of claim 12 wherein the third camera status notification further indicates whether a still image was captured or video recording was begun.

14. The method of claim 12 further comprising, after sending the third camera status notification:

receiving, by the portable device, a second instruction to capture an image, wherein the second instruction to capture an image is received as either an image capture command from the accessory or an image capture signal from the user interface of the portable device; and in response to the second instruction to capture an image:

capturing a second still image in the event that the second image capture command is received while the current camera mode is the still-image mode;

ending recording of the video image in the event that the second image capture command is received while the current camera mode is the video mode; and sending, to the accessory, a fourth camera status notification indicating that a second image capture operation has been performed.

15. The method of claim 14 wherein one of the first instruction to capture an image or the second instruction to capture an image is received as an image capture command from the accessory and the other of the first instruction to capture an image or the second instruction to capture an image is received as an image capture signal from the user interface of the portable device.

16. The method of claim 12 wherein the first instruction to capture an image is received as an image capture command from the accessory.

17. The method of claim 12 wherein the first instruction to capture an image is received an image capture signal from the user interface of the portable device.

18. The method of claim 12 further comprising:

in the event that the camera is inactive, sending, by the portable device, a fourth camera status notification indicating that the camera is inactive.

19. The method of claim 18 further comprising:

receiving, by the portable device, an instruction from the accessory to activate the camera.

20. A portable device comprising:

a user interface;

a camera operable in a plurality of camera modes including a still mode to capture still images and a video mode to record video;

an accessory interface to communicate with an accessory; and a processor coupled to the user interface, the camera, and the accessory interface, wherein the processor is configured to communicate with the accessory via the accessory interface using a plurality of commands, the plurality of commands including:

a first command receivable by the portable device, the first command requesting registration for camera status notifications;

a second command sendable by the portable device, the second command including a camera status notification, wherein the camera status notification includes information indicative of an operational state of the camera and wherein the processor is configured to send the second command in response to a change in the operational state of the camera; and a third command receivable by the portable device, the third command including either an indication that the user has operated a mode button of the accessory or an indication that the user has operated an action button of the accessory, wherein the second command is sendable asynchronously with respect to receiving of the third command; and wherein the processor is further configured to:

change a current camera mode of the camera to a next one of the plurality of camera modes in response to receiving the third command, in the event that that the third command includes the indication that the user has operated the mode button;

operate the camera to capture a still image in response to receiving the third command, in the event that the third command includes the indication that the user has operated the action button and the current camera mode is the still mode; and operate the camera to start or stop video recording in response to receiving the third command, in the event that the third command includes the indication that the user has operated the camera action button and the current camera mode is the video mode;

receive user input signals from the user interface; and operate the camera in response to the user input signals, wherein the processor is configured such that the camera is concurrently operable using the user input signals from the user interface and the commands from the accessory.

21. The portable device of claim 20 wherein the processor is further configured to:

send a first instance of the second command to the accessory in response to changing the current camera mode, the first instance of the second command including an indication of the camera mode to which the current camera mode was changed;

send a second instance of the second command to the accessory in response to capturing a still image, the second instance of the second command indicating that a still image has been captured;

send a third instance of the second command to the accessory in response to starting or stopping video recording, the third instance of the second command indicating whether video recording is started or stopped.

22. The portable device of claim 20 wherein the plurality of commands further includes:

a fourth command receivable by the portable device, the fourth command instructing the portable device to activate the camera.

23. The portable device of claim 20 wherein the processor is further configured to send a representation of a captured still image or video recording to the accessory.

* * * * *